May 21, 1940.  C. L. LEAFE  2,201,734
PULPSTONE
Filed June 9, 1938
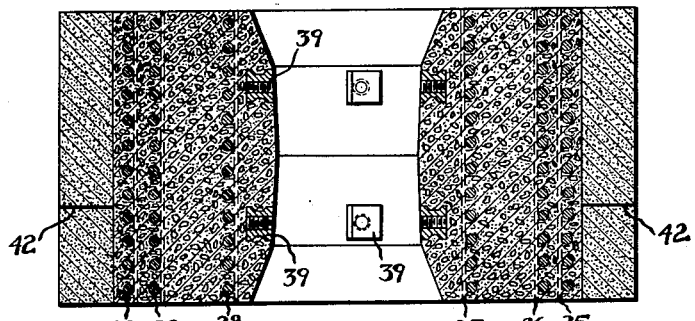
Fig.1
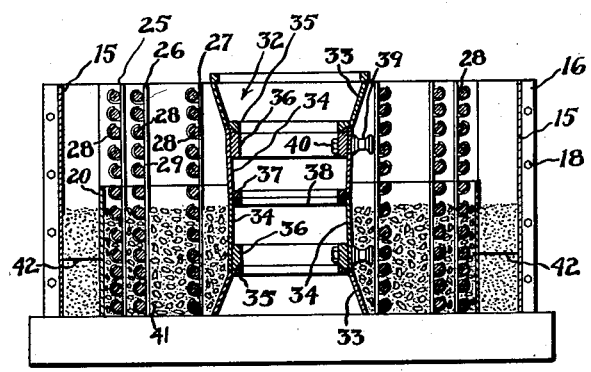
Fig.2
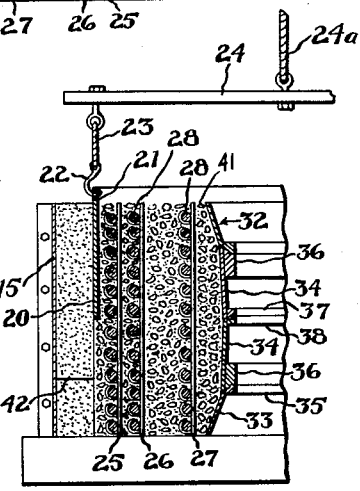
Fig.3
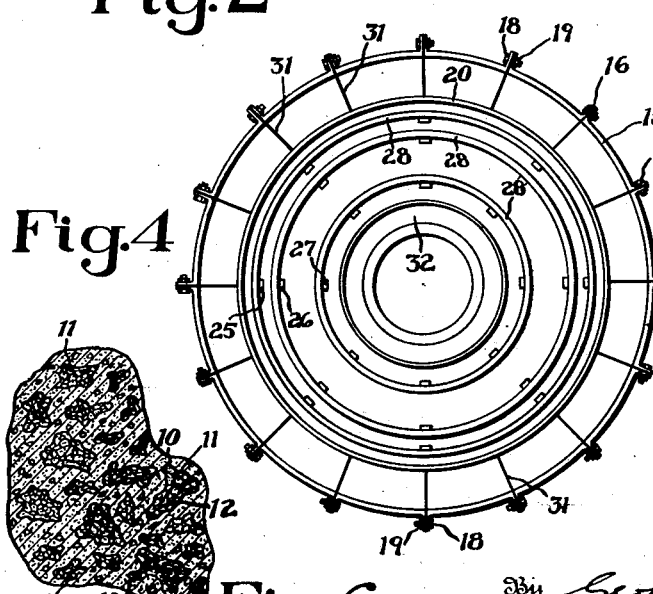
Fig.4
Fig.5
Fig.6
Inventor
CARL L. LEAFE
By George Compton
Attorney Patented May 21, 1940

2,201,734

UNITED STATES PATENT OFFICE 2,201,734

PULPSTONE

Carl L. Leafe, Worcester, Mass., assignor to Norton Company, Worcester, Mass., a corporation of Massachusetts Application June 9, 1938, Serial No. 212,625
In Great Britain May 23, 1938

4 Claims. (Cl. 51—206)

The invention relates to abrasive wheels, and with regard to its more specific features to that type of abrasive or grinding wheel which is particularly adaptable for the grinding of logs to make pulp for the manufacture of paper.

One object of the invention is to provide an integral artificial pulpstone. Another object of the invention is to provide a pulpstone which can be manufactured at low cost. Another object of the invention is to provide a simple and practical method for the manufacture of a pulpstone. Another object of the invention is to provide a pulpstone of a quality to handle fine and coarse grained woods. Another object of the invention is to provide a reinforced monolithic construction for a pulpstone of great strength. Another object of the invention is to provide a monolithic pulpstone having nevertheless a certain amount of resiliency to avoid fracture when overheated. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the accompanying drawing illustrating one of many possible embodiments of the mechanical features of this invention:

Figure 1 is an axial sectional view of a pulpstone constructed in accordance with the invention;

Figure 2 is an axial sectional view of the apparatus used in the manufacture of the stone of Figure 1, illustrating the method of manufacture of the invention;

Figure 3 is a partial axial sectional view of the apparatus illustrating a later stage in the manufacture;

Figure 4 is a plan view of the apparatus used for manufacturing the pulpstone;

Figure 5 is an elevation of the pulpstone on a smaller scale;

Figure 6 is a magnified sectional view through any part of the outer peripheral abrasive portion of the stone to show the structure thereof.

I provide a quantity of vitrified aggregates 10. Referring now to Figure 6, each aggregate is an irregular particle like crushed stone consisting of a great number of abrasive granules 11 bonded together with a vitrified, ceramic or silicate bond 12. The abrasive grains may be of any desired type, of which examples are alumina in its many forms including emery, corundum and fused electric furnace alumina, also silicon carbide, and various varieties of silica. Preferred abrasives for pulp grinding are alumina and silicon carbide, of which silicon carbide has been the preferred variety on account of its free cutting qualities. However, one of the features of the invention is that in a pulpstone constructed in accordance with the invention, I can use fused alumina instead of silicon carbide with comparable results, which is an advantage in view of the fact that fused alumina is cheaper than silicon carbide which is also an electric furnace product, being made in a furnace of the resistance type.

The bond 12 may be and preferably is produced by mixing various clays and vitrifying in a ceramic kiln. In the above category should be included bonds produced by fusing premade vitreous frits as well as clay mixtures.

To form the abrasive aggregates 10, I mix the desired size and kind of abrasive grain 11 with the desired clay mixture, first wetting the abrasive granules so that they will retain the clay. I then press the mixture into any desired shape in a press, vitrify the shape in a kiln, and crush the same into fragments constituting aggregates 10. So far as certain features of the invention are concerned, these aggregates 10 may be made by crushing vitrified grinding wheels, for example that portion thereof which is gripped by the spindle flanges and which, therefore, cannot be completely used up on the machine.

I provide one part by weight of such vitrified aggregates 10, as hereinabove described. I further provide one part by weight of fine sand (quartz). I further provide one part of Portland cement. It will be understood that although I have given specific proportions as a preferred embodiment of the invention, these may be widely varied.

Referring now to Figures 2, 3 and 4, I provide a plurality of segmental steel or iron shell segments 15. I have herein shown sixteen such shell segments which is an adequate number. When joined, these shell segments 15 form a complete cylindrical shell. Each shell segment 15 has a radial flange 16 at each end thereof extending the entire length of the shell. The shell segments 15 can be radially joined together by means of bolts 18 extending through the flanges 16, nuts 19 being provided to fit the bolts whereby the flanges 16 may be tightened together and whereby the bolts 18 can be readily removed. When the segments 15 are joined together in this manner, there is provided a hollow cylinder with an unbroken interior cylindrical surface which, however, may readily be opened.

I stand the cylindrical shell formed by joining the segments 15 on the floor. Inside of it and coaxial with it, I place a steel sleeve 20. This constitutes an unbroken cylindrical sleeve with a plurality of eyes 21 at the top thereof. Hooks 22 attached to cables 23 running to a supporting bar 24 supported by a cable 24a running to a pulley overhead, not shown, are placed in the eyes 21 whereby the sleeve 20 may be readily raised as desired.

Inside of the steel sleeve 20 I place cages 25, 26 and 27. Preferably these each consist of rings 28 formed of steel bar or piping joined together by longitudinal supports 29, as shown in Figures 2 and 3. The cages 25, 26 and 27 are concentrically located inside of the segments 15 and inside of the sleeve 20. The ends of the bars forming the rings 28 may be welded together and these rings impart great strength and resistance to centrifugal force to the center of the stone.

I further provide a series of flat elongated strips of rubber with cork filler 31. These may be cut from flat sheets of material. A composition for manufacturing such rubber cork material is described in United States Letters Patent No. 2,054,771 granted September 15, 1936, to Thure Larsson. The rubber compound may be, for example, 50% rubber, 27% sulphur, 23% silicon carbide, and taking 100 parts of such rubber compound, I may add 40 parts of ground cork. The cork should not be ground too fine. Such a substance makes an excellent filler material for pulpstones as it is strong but compressible. Strips of this material 31 I place on the inside of the shell formed of the segments 15, these filler strips 31 extending the entire length of the shell, clamped between the flanges 16 and extending radially, as shown in Figure 4.

Inside of the small diameter and inner cage 27 I place an interior forming shell designated generally by the numeral 32. This may comprise a pair of hollow steel cones 33, one at the top and one at the bottom of the shell, joined together by a pair of nearly cylindrical shell members 34. All these parts are preferably made of steel or iron. Shells 33 have rings 35 attached to the inside thereof. These rings 35 have annular grooves, as shown. The shells 34 have rings 36 attached to the inside thereof, which rings also have annular grooves, as shown in Figure 2. One of the shells 34 has a ring 37 and the other shell has a ring 38 attached to the inside thereof and these rings likewise have grooves. The several grooves are formed so that the parts will fit together, as clearly illustrated in Figure 2, and the parts may be as easily separated after the stone is formed.

Nuts 39 are held in place outside the shells 34 by means of bolts 40 passing through the rings 36.

The set-up for the pouring of the stone is now complete. All parts mentioned except the sleeve 20 are of substantially the same height and all of them are concentric. Taking the mixture hereinbefore specified and adding a desired amount of water, I pour this between the sleeve 20 and the shell segments 15. I provide another mixture which is the same as the foregoing mixture except in place of aggregates there is substituted crushed trap rock 41. In other words, it consists of one part fine sand (quartz), one part trap rock, and one part of Portland cement, by weight, with a desired amount of water to plasticize it and make it set. Variations of the mixture can readily be made in accordance with the practice in forming concrete. This is true also of the mixture first described. I pour this second mixture of sand, trap rock and Portland cement and water around and upon the cages 25, 26 and 27, that is to say between the sleeve 20 and the shell 32.

I pour both mixtures together, that is to say, neither mixture is allowed to rise any appreciable amount higher than the other one in the manufacture of the stone. As they are poured, I lift the sleeve 20 by the cables 23. The sleeve 20 is altogether withdrawn at the end of the pouring operation. As the result of this procedure a unitary mass is formed, but only in the outer portion outside of the space occupied by the sleeve 20 are there abrasive aggregates.

I then allow the concrete to set for a number of days. Preferably I select a Portland cement which is quick setting and the entire stone may be hard in four days. I then remove the shell 32. The cones 33 readily come out and the shell members 34 have a slight taper and so also are removable after the bolts 40 have been withdrawn. Either before or after removing the shell 32, I remove the bolts 18 and take off the segments 15. This leaves projecting portions of the strip material 31 which, however, may readily be cut away with a knife or allowed to remain since the first time the stone is actually put into operation, these projecting portions will be quickly broken down to the level of the cylindrical surface of the stone.

As indicated in Figures 1 and 5, I may insert, for example in every other space defined by a segment 15, the sleeve 20 and a pair of strips 31, a flat strip 42 of the same material, of the area defined by the space aforesaid and extending in a radial plane of the entire stone. Two such strips 42 are shown in Figure 1 and the position of others is indicated in Figure 5. These strips 42 are put in place during the pouring of the cement aggregate mixture. The exact position of each strip 42 is not a matter of precision but I prefer to adopt the staggered construction indicated in Figure 5.

Characteristics of the stone are that the aggregates will grind very hard woods into fine pulp and at the same time they will grind soft woods. This is because each individual abrasive particle 11 acts as an abrasive on hard wood, while the aggregates themselves act as individual abrasives on soft wood. There is thus a dual abrasive action to the stone. Furthermore, the sand particles themselves act as an abrasive, thus giving a treble abrasive action. The stone is dense enough and the bond consisting of Portland cement is hard enough so that it will not wear away rapidly.

The filler strips 31 allow for expansion of the peripheral portion of the stone without cracking. It is known that pulpstones are subjected to cold weather during transportation in northern climates and when in use in the mill may be subjected to steam temperatures and even higher when the water fails for any cause during the grinding operation. Under such circumstances, the peripheral portion of the stone may be overheated while the interior thereof may still be cool. Even a monolithic stone can stand some warping provided centripetal or centrifugal strains are not created to a great extent. As the outer peripheral portion expands, the filler strips 31 can crush and this relieves the strain and preserves the stone from fracturing. The strips 42 serve to reduce longitudinal strains and stresses in like manner. In some cases, and for stones of some size, these may be omitted.

The stone is of great strength owing to the reinforced concrete on the inside. The mixture of sand, Portland cement and abrasive aggregates also makes a very strong construction. The size of the crushed trap rock 32 may vary widely and, in fact, any desired concrete mix may be provided for the center of the stone. The abrasive aggregates 10 may also vary in size, but by way of example they may be between 12 and 2 grit size, that is, just passing through screen of that many meshes to the linear inch. The embedded nuts 39 are adapted to receive bolts, not shown, the heads of which rest against the shaft, not shown, upon which the stone is mounted. By turning these adjustment bolts, the stone is accurately centered on its driving shaft. This feature of the mounting of a stone is disclosed in patent to Thure Larsson, No. 1,920,204.

It will thus be seen that there has been provided by this invention an article and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. An integral pulpstone comprising a reinforced Portland cement concrete center portion, and an outer portion integrally joined thereto and comprising Portland cement concrete embedding and bonding abrasive aggregates each one of which consists of a number of discrete abrasve particles bonded together with a vitrified ceramic bond.

2. An integral pulpstone according to claim 1 in which the reinforcement in the center portion is in the form of a steel cage.

3. An integral pulpstone as claimed in claim 1 in which the reinforcement in the center portion is in the form of a plurality of concentric steel cages.

4. An integral pulpstone as claimed in claim 1 having compressible material in sheet form molded into the outer abrasive portion to provide for differential expansion of the pulpstone due to heating thereof.

CARL L. LEAFE.